Sept. 22, 1964   H. L. HAGEN   3,149,433
DECOY ANCHORS
Original Filed April 25, 1961

Herman L. Hagen
INVENTOR

BY A. Richard Koch
AGENT

United States Patent Office 3,149,433
Patented Sept. 22, 1964

3,149,433
DECOY ANCHORS
Herman L. Hagen, 420 Madison St., Walworth, Wis.
Continuation of application Ser. No. 105,515, Apr. 25, 1961. This application Dec. 22, 1961, Ser. No. 161,480
1 Claim. (Cl. 43—3)

This invention pertains to improvements in decoy anchors and more particularly to their storage with the decoys as compact units ready for instant use. This is a continuation of application Serial No. 105,515, filed April 25, 1961 and now abandoned.

It is an object of this invention to provide an anchor adapted to be lashed to a decoy by the anchor line, forming a cinch strap or girdle and eliminating the possibility of the line becoming entangled with itself or other objects. One object is to provide an anchor that may be lashed by the anchor line to a decoy such that the line falls freely away without tangling to release the anchor from its lashing to the decoy when desired. A further object is to provide a device of the character described that may be launched and anchored at some distance from the hunter without entangling the line and with little effort. Another object is to provide a simple, practical, reliable and economical device for accomplishing the intended purpose.

Decoys, used by duck hunters to attract wild ducks within shooting range, must be anchored to prevent their drifting away from the desired location. When in use, the decoy is connected to the anchor by an anchor line. It is convenient to leave the anchor connected to the decoy when not in use. Hunters often wrap the anchor line around the decoy to keep it from becoming tangled with itself or other objects. While this solves one problem, it creates another, since the line must be unwrapped before the decoy can be used and the resulting loose line can easily become tangled. Furthermore the decoy must be launched close to the hunter because the long line and separated decoy and anchor make it difficult to launch it elsewhere. This invention overcomes these difficulties.

One form of this invention is shown in the drawings, in which—

Figure 2:
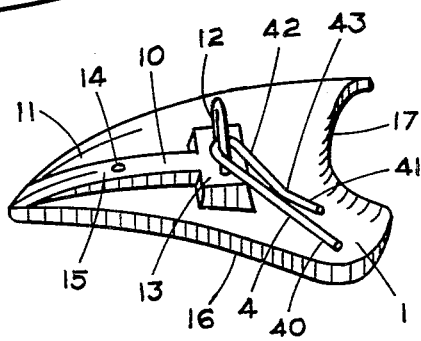
FIG. 2 is a perspective view of the anchor with the pin clipped to it.

As shown in the drawings, the anchor 1, when not being used, is lashed to decoy 2 by the anchor line 3 held in position by pin 4. Anchor 1 is of sufficient density and mass to sink to the bottom of the lake and hinder the decoy 2 drifting away. Anchor 1 is somewhat heart shaped with a T shaped ridge 10 on its convex upper side 11. A staple or line attachment means 12 is supported in the crosspiece 13 of the T 10. A hole or socket 14 is provided in the upright portion 15 of the T 10. The concave under side 16 of anchor 1 is designed to fit the contour of the decoy 2 and to embed the anchor in the lake bottom in the event that the decoy 2 tends to drift and drag the anchor. A concave yoke 17 fits partially around the neck 20 of decoy 2. The decoy 2 may be made of any buoyant material. The anchor line 3 is fastened at one end 30 to the staple 12 on anchor 1 and at the other end 31 to an under portion 21 of the decoy 2. The line is of sufficient length to reach from the anchor on the bottom of the lake to the decoy on the surface and not so long as to allow the decoy to drift too far from the anchor. The pin 4 may be made of wire, as shown in FIG. 2, having a long straight end 40 to enter socket 14 and a short end 41 acting as a stop to prevent long end 40 from protruding through the under side 16, where it could puncture decoy 2. Between end 40 and stop 41 is an elongated open loop or eye 42 that serves as a convenient place to grasp the pin 4 and is adapted to receive staple 12, a kink 43 near the short end 41 being adapted to cooperate with the straight end 40 to form a friction latch to prevent unintentional removal from the staple 12.

Figure 1:
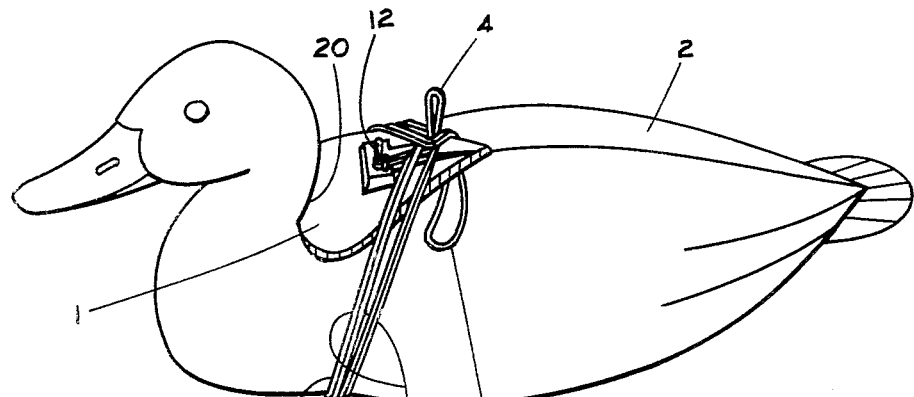
FIG. 1 is a perspective view of a decoy with the anchor lashed to it.
Figure 3:
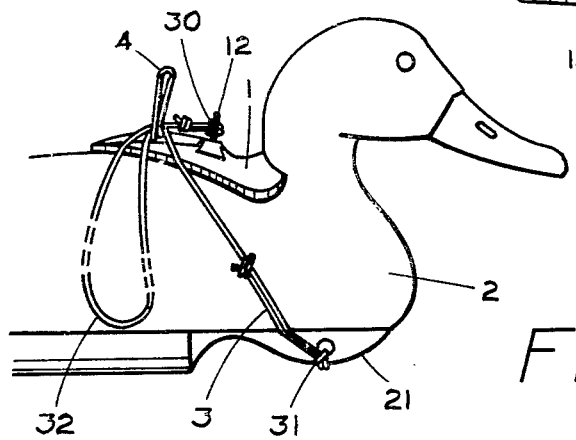
FIGS. 3 and 4 are partial views showing details of the lashing.
Figure 4:
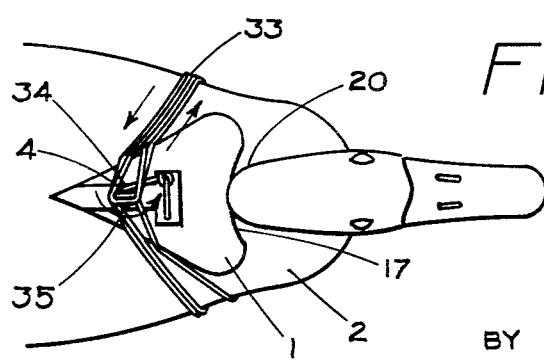

When the decoy 2 is not in use, the anchor 1 is placed on the decoy 2 with the concave under side 16 against the decoy and yoke 17 fitted against the neck 20. The pin 4 is inserted in the socket 14, extending outwardly from the decoy 2. Anchor line 3 is doubled to form a bight 32 and drawn around one side of pin 4, as shown in FIG. 3, after which the remainder of the bight 32 is wound snuggly around the decoy 2, being looped over pin 4 after each passage once around the decoy 2 so that the bight 32 leaves pin 4 on the same side of decoy 2 from which the bight 32 approached the pin, as shown by the arrows in FIG. 4. This results in anchor 1 being tightly lashed to decoy 2 by a girth 33 of anchor line 3 terminating at each end in a series of interleaved loops 34 and 35, pulling on pin 4 in opposite directions. The last portion of bight 32 is secured by being drawn between anchor 1 and decoy 2, as shown in FIG. 1. The anchor 1 and decoy 2 may now be handled as a convenient unit without becoming entangled with similar units or other equipment.

When the decoy is to be launched, the upper of loops 34 or 35 is held in place as by the thumb while the pin 4 is removed from the socket 14 and from between the overlapping loops 34 and 35 and clipped to staple 12, as shown in FIG. 2, to prevent its loss. As long as the upper of the loops 34 or 35 is held in place, the other loops 34 and 35 will be held in place by friction. The decoy 2 and anchor 1 may then be placed in, or thrown into, the water as a unit. When the upper of the loops 34 or 35 is released, the interleaved loops 34 and 35 automatically disengage themselves sequentially, allowing girth 33 to fall away from the decoy 2 and free anchor 1, which, being heavy, will tip the decoy 2, allowing anchor 1 to fall off and sink to the bottom of the lake without any tangling of the line 3.

It will be seen that no time or effort is lost in unwrapping the line 3 from decoy 2 and there is no loose line to become entangled before, or when, the decoy 2 is launched. These advantages accrue from this improvement over the prior art. My invention is not limited to the embodiment shown and described, but only by the scope of the claim.

I claim as my invention:

For use with a decoy and an anchor line attached thereto, an anchor and a pin mounted removably upon the anchor; said anchor having a concave underside adapted in storage position to abut the decoy, an upper side, a staple on the upper side adapted to secure said line, said upper side having a socket therein adapted to loosely receive and support the pin in a perpendicular position; said pin bent to form an elongated open eye, a first end of said pin adapted selectively to enter said socket, a second end of the pin engageable with said anchor to prevent protrusion of said first end through the underside, a kink in said pin adjacent said second end cooperating with the first end to form a friction latch adapted selectively to releasably retain the pin on said staple; said pin when received in the socket adapted to releasably retain in storage interleaved oppositely pulling loops of the line passing once around said decoy and the anchor; removal of said pin from the socket and loops releasing said loops of line to fall freely away from storage position.

References Cited in the file of this patent

UNITED STATES PATENTS

| | | |
|---|---|---|
| 913,030 | Miller et al. | Feb. 23, 1909 |
| 1,444,342 | Godward | Feb. 6, 1923 |
| 1,565,474 | Link | Dec. 15, 1925 |
| 2,555,815 | Rawlins et al. | June 5, 1951 |
| 2,712,197 | Lewis | July 5, 1955 |